May 9, 1933.  J. F. J. BETHENOD ET AL  1,908,008

STEERING MECHANISM

Filed June 3, 1927

INVENTOR
JOSEPH F. J. BETHNOD
NEMORIN-LAURENT CAUSAN
BY
M. W. McConkey
ATTORNEY

Patented May 9, 1933

1,908,008

UNITED STATES PATENT OFFICE

JOSEPH FREDERIC JULIEN BETHENOD, OF PARIS, AND NEMORIN LAURENT CAUSAN, OF SURESNES, FRANCE

STEERING MECHANISM

Application filed June 3, 1927, Serial No. 196,291, and in France June 4, 1926.

The present invention relates to improvements in the steering mechanism of automobiles or the like.

It is well known that the presence of the connecting or tie rod of the steering gear is very dangerous in case of obstacles on the road. It is also true that when the controlling rod of the steering gear, or the steering lever, is accidentally broken, the two front wheels are simultaneously out of control, and that very serious damages can follow.

The independent steering of each front wheel avoids the possibility of such accidents. Even in the case of a breaking of one of the controlling rods or steering levers, the other wheel remains controlled by means of the steering wheel.

Furthermore, it is obvious that the absence of the tie rod is very advantageous in considering the design of the chassis, particularly in those designs where the front wheels of the vehicle are simultaneously tractive and directive.

Figure 1:
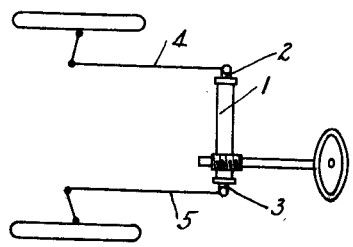
Figure 2:
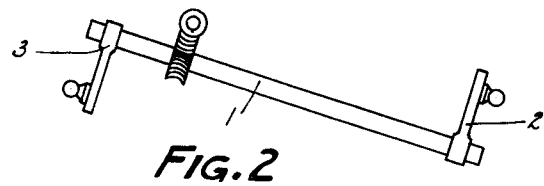
Figure 3:
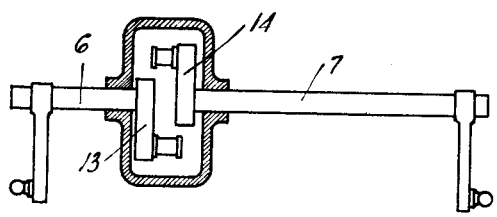
Figure 4:
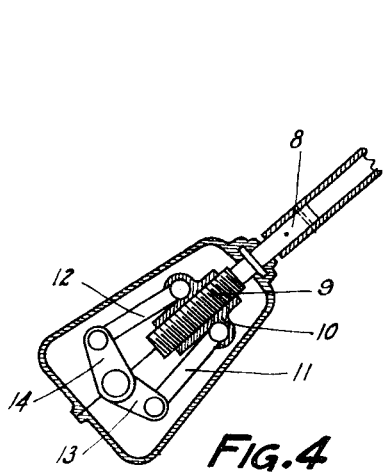

The aforementioned objects of the invention and other objects and desirable details of construction and combinations of parts will be apparent from the following detailed description of certain preferred embodiments of the invention disclosed in the accompanying drawing, in which:

Figure 1 discloses diagrammatically one arrangement of our steering wheel invention;

Figure 2 is a fragmentary view of the mechanism of Figure 1 disclosing, in detail, the diagonally-extending transverse shaft and cooperating steering mechanism;

Figures 3 and 4 disclose details of a modified form of steering mechanism; and

Figure 5:
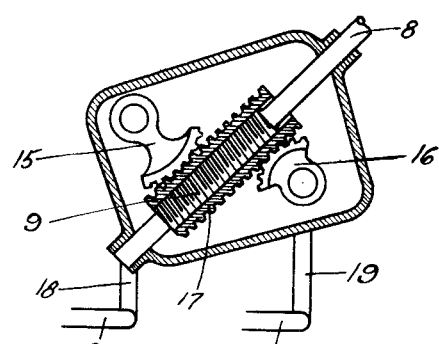

Figure 5 discloses, in longitudinal section, a further modified form of steering mechanism.

Figures 1 and 2 show diagrammatically a simple embodiment of our invention there being provided a transversely-extending shaft 1, which is inclined (Fig. 2) in order to bring, in the same horizontal plane, the extremities of levers 2 and 3, which control the front wheels by means of rods or drag links 4 and 5 (Fig. 1).

Figures 3 and 4 disclose a second embodiment of the invention in which transversely extending shafts 6 and 7, rotate inversely under the action of the steering wheel which is keyed on a shaft or steering post 8, and on which a screw 9 is provided in order to constrain a nut 10 to slide longitudinally; the nut 10 which cannot rotate, controls the angular displacements of levers 13 and 14 by means of the links 11 and 12.

According to a further embodiment disclosed in Figure 5, a screw 9 is provided on the steering post or shaft 8 operative to displace a nut 17, the latter controlling the angular displacement of levers 18 and 19, operatively connected to two segments 15 and 16, the latter in operative engagement with the longitudinally movable nut 17.

Levers 18 and 19 serve to actuate tie rods 20 and 21 and in order to bring said controlling rods into the same horizontal plane, the radii of the segments 15 and 16 are chosen preferably proportional to the lengths of the levers 18 and 19.

There is thus provided a very simple means for steering the dirigible wheels of an automotive vehicle, the transversely-extending shaft of the mechanism being inclined for the purposes heretofore indicated. The transverse shaft may also be conveniently disposed between the crank shaft and the clutch of the vehicle.

Other advantages of the structure will be obvious to those skilled in the art including the interchangeability of the steering arms 2 and 3 and the movement of the drag links in opposite directions in the same plane to effect the directional control of the vehicle.

Having thus described our invention, what we claim as new and desire to secure by Letters Patent is:

1. Steering mechanism for the swiveled front wheels of a motor vehicle comprising, in combination, a steering post, a unitary shaft extending transversely of the vehicle and coupled with the post to be rotated thereby, such shaft arranged diagonally in a vertical plane and provided at opposite ends with oppositely directed arms and connections leading from said arms in substantially the same horizontal plane to the swiveled wheels.

2. Steering mechanism comprising, in combination with a steering post provided with a worm member, a unitary shaft extending transversely thereof and coupled with the worm for rotation, said shaft arranged diagonally in a vertical plane and provided at opposite ends with oppositely directed arms having their extremities disposed in substantially the same horizontal plane, and a connection from the extremity of each arm to the adjacent swiveled wheel.

3. Steering mechanism comprising, in combination, a steering post, a unitary transversely extending shaft coupled therewith for rotation, said shaft arranged diagonally in a vertical plane and provided at opposite ends with oppositely directed arms having end connections disposed in substantially the same horizontal plane.

JOSEPH FREDERIC JULIEN BETHENOD.
NEMORIN LAURENT CAUSAN.